United States Patent
Okubo et al.

(10) Patent No.: US 10,717,372 B2
(45) Date of Patent: Jul. 21, 2020

(54) VEHICLE SEAT

(71) Applicant: TS TECH CO., LTD., Asaka-shi, Saitama (JP)

(72) Inventors: Tatsuya Okubo, Tochigi (JP); Makoto Takeuchi, Tochigi (JP); Tsutomu Matsuzaki, Tochigi (JP); Tsuyoshi Komori, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 2 days.

(21) Appl. No.: 16/245,943

(22) Filed: Jan. 11, 2019

(65) Prior Publication Data

US 2019/0217746 A1 Jul. 18, 2019

Related U.S. Application Data

(60) Provisional application No. 62/616,572, filed on Jan. 12, 2018.

(51) Int. Cl.
| | |
|---|---|
| *B60N 2/02* | (2006.01) |
| *B60N 2/58* | (2006.01) |
| *B60N 2/62* | (2006.01) |
| *B60N 2/68* | (2006.01) |

(52) U.S. Cl.
CPC ......... *B60N 2/0284* (2013.01); *B60N 2/5825* (2013.01); *B60N 2/62* (2013.01); *B60N 2/68* (2013.01)

(58) Field of Classification Search
CPC ........... B60N 2/0284; B60N 2/62; B60N 2/72
USPC ....... 297/284.11, 218.1, 218.2, 218.3, 218.4, 297/218.5
See application file for complete search history.

(56) References Cited

U.S. PATENT DOCUMENTS

| | | | | |
|---|---|---|---|---|
| 5,588,708 | A * | 12/1996 | Rykken | A47C 7/506 297/284.11 |
| 5,820,213 | A * | 10/1998 | Severinski | A47C 31/023 297/218.5 |
| 5,826,939 | A * | 10/1998 | Beyer | B60N 2/6009 297/218.3 |

(Continued)

FOREIGN PATENT DOCUMENTS

| | | | | |
|---|---|---|---|---|
| DE | 102008043196 A1 * | 4/2010 | | B60N 2/0284 |
| FR | 2862579 A1 * | 5/2005 | | B60N 2/0284 |

(Continued)

*Primary Examiner* — Rodney B White

(74) *Attorney, Agent, or Firm* — Hamre, Schumann, Mueller & Larson, P.C.

(57) ABSTRACT

In a vehicle seat, a movable frame provided at a front end portion of a stationary frame is slidable frontward and rearward, and an outer covering is provided to extend frontward from an upper side of the stationary frame and configured to wrap around a front end portion of the movable frame. Engageable members are provided to extend along the left and right end portions of the outer covering. The movable frame has grooves extending from an upper surface, through a front surface and to an undersurface thereof. The engageable members are engageable in the grooves. Each groove includes a first groove section, and a second groove section extending from the first groove section in a direction different from a direction in which the first groove section extends. Each engageable member includes a body portion extending from the outer covering and a claw portion extending from the body portion.

4 Claims, 11 Drawing Sheets

(56) References Cited

U.S. PATENT DOCUMENTS

| | | | | |
|---|---|---|---|---|
| 5,988,748 | A * | 11/1999 | Morrison | B60N 2/0232 |
| | | | | 297/284.11 X |
| 6,386,633 | B1 * | 5/2002 | Newton | B60N 2/62 |
| | | | | 297/284.11 X |
| 7,192,087 | B2 * | 3/2007 | Adragna | B60N 2/62 |
| | | | | 297/284.11 X |
| 7,556,312 | B2 * | 7/2009 | Yoshikawa | B60N 2/42763 |
| | | | | 297/284.11 X |
| 7,669,929 | B2 * | 3/2010 | Simon | B60N 2/0224 |
| | | | | 297/284.11 |
| 7,874,621 | B2 * | 1/2011 | Gumbrich | B60N 2/0284 |
| | | | | 297/284.11 |
| 7,997,648 | B2 * | 8/2011 | Becker | B60N 2/0284 |
| | | | | 297/284.11 |
| 8,011,728 | B2 * | 9/2011 | Kohl | B60N 2/0284 |
| | | | | 297/284.11 |
| 8,128,167 | B2 * | 3/2012 | Zhong | B60N 2/62 |
| | | | | 297/284.11 |
| 8,272,687 | B2 * | 9/2012 | Gross | B60N 2/4221 |
| | | | | 297/284.11 X |
| 8,297,697 | B2 * | 10/2012 | Gross | B60N 2/4221 |
| | | | | 297/284.11 X |
| 8,393,681 | B2 * | 3/2013 | Gross | B60N 2/42763 |
| | | | | 297/284.11 |
| 8,573,696 | B2 * | 11/2013 | Kuno | A47C 7/506 |
| | | | | 297/284.11 |
| 9,016,785 | B2 * | 4/2015 | Freisleben | B60N 2/0232 |
| | | | | 297/284.11 |
| 9,073,469 | B2 * | 7/2015 | Fujikawa | B60N 2/72 |
| 9,365,142 | B1 * | 6/2016 | Line | B60N 2/62 |
| 9,399,418 | B2 * | 7/2016 | Line | B60N 2/929 |
| 9,616,776 | B1 * | 4/2017 | Kondrad | B60N 2/0284 |
| 9,809,132 | B2 * | 11/2017 | Bortolon | B60N 2/62 |
| 9,981,582 | B2 * | 5/2018 | Line | B29C 43/18 |
| 10,045,623 | B2 * | 8/2018 | Bortolon | B60N 2/914 |
| 10,046,681 | B2 * | 8/2018 | Line | B60N 2/0284 |
| 10,081,279 | B2 * | 9/2018 | Line | B60N 2/68 |
| 10,266,073 | B2 * | 4/2019 | Line | B60N 2/0232 |
| 10,286,818 | B2 * | 5/2019 | Line | B60N 2/62 |
| 2007/0090673 | A1 * | 4/2007 | Ito | B60N 2/0284 |
| | | | | 297/330 |
| 2007/0108817 | A1 * | 5/2007 | Lee | B60N 2/62 |
| | | | | 297/284.11 |
| 2011/0254335 | A1 * | 10/2011 | Pradier | B60N 2/0232 |
| | | | | 297/284.11 |
| 2015/0352980 | A1 * | 12/2015 | Rehfuss | B60N 2/0284 |
| | | | | 297/284.11 |
| 2016/0339806 | A1 * | 11/2016 | Popescu | B60N 2/0284 |
| 2018/0099595 | A1 * | 4/2018 | Kondrad | B60N 2/0232 |
| 2019/0135139 | A1 * | 5/2019 | Ioppolo | B60N 2/0284 |
| 2019/0160990 | A1 * | 5/2019 | Morrow | B60N 2/72 |
| 2019/0184858 | A1 * | 6/2019 | Anzenberger | B60N 2/0284 |

FOREIGN PATENT DOCUMENTS

| | | | | |
|---|---|---|---|---|
| FR | 2958593 | A1 * | 10/2011 | B60N 2/0232 |
| FR | 3051738 | B1 * | 6/2018 | B60N 2/72 |
| JP | 2011189783 | A | 9/2011 | |

* cited by examiner

VEHICLE SEAT

CROSS-REFERENCE TO RELATED APPLICATION(S)

This application claims the benefit of U.S. Provisional Application No. 62/616,572, filed on Jan. 12, 2018, the disclosure of which is incorporated herein by reference in its entirety.

BACKGROUND

1. Field

Apparatuses disclosed herein relate to a vehicle seat with a length-adjustable seating surface.

2. Description of the Related Art

A vehicle seat of which a seating surface is adjustable for length in a front-rear direction according to a physique of an occupant to be seated is known in the art. For example, a vehicle seat disclosed in JP 2011-189783 A comprises a seat cushion, which includes a stationary frame and a movable frame provided at a front end portion of the stationary frame and configured to be slidable frontward and rearward relative to the stationary frame. An outer covering provided to cover the stationary frame and the movable frame extends frontward from an upper side of the stationary frame, wraps around a front end portion of the movable frame, and further extends up to an underside of the stationary frame. At the front end of the outer covering, straps extending rearward are provided so that the front end of the outer covering is being pulled by the straps toward rearward. In this vehicle seat, the frontward movement of the movable frame causes the outer covering to be pulled by the movable frame so that the front end of the outer covering moves frontward, while the rearward movement of the movable frame causes the front end of the outer covering to be pulled by the straps and to move rearward.

SUMMARY

In order to have the left and right ends of the outer covering tucked in the seat cushion and attached to the movable frame, the movable frame may conceivably be provided with grooves in which engageable members fixed to the left and right ends of the outer covering are engageable. However, if the movable frame provided with such grooves move as described above, the engageable members should be movable relative to the grooves, and are thus likely to come off from the grooves.

It would be desirable to provide a vehicle seat in which engageable members provided for an outer covering to be tucked in are kept from coming off from grooves.

In one aspect, a vehicle seat comprising a stationary frame, a movable frame, an outer covering, and left and right engageable members is disclosed. The movable frame is provided at a front end portion of the stationary frame and configured to be slidable frontward and rearward between a first position and a second position that is frontward of the first position. The movable frame includes left and right end portions. The outer covering is provided to extend frontward from an upper side of the stationary frame and configured to wrap around a front end portion of the movable frame. The outer covering includes left and right end portions. The left and right engageable members are provided on the outer covering. The left and right engageable members extend, respectively, along the left and right end portions of the outer covering. The movable frame has an upper surface, a front surface, an undersurface, and left and right grooves. The left and right grooves are provided, respectively, in the left and right end portions of the movable frame. Each groove extends from the upper surface of the movable frame, through the front surface of the movable frame and further extends to the undersurface of the movable frame. The left and right engageable members are engageable in the left and right grooves, respectively. Each groove includes a first groove section extending deep in a direction away from the outer covering, and a second groove section extending from the first groove section in a direction different from a direction in which the first groove section extends. Each of the left and right engageable members includes a body portion extending from the outer covering and a claw portion extending from the body portion. The body portion is disposed in the first groove section. The claw portion is disposed in the second groove section.

With this configuration, when the outer covering is pulled, the claw portion is caught on the edge of the second groove section so that the engageable member can be kept from coming off from the groove.

The vehicle seat configured as described above may be configured such that the second groove section has a first wall and a second wall, a position of the first wall being closer to the outer covering than a position of the second wall, the first wall having a first end portion and a second end portion, a position of the first end portion being closer to the first groove section than a position of the second end portion, the second groove section including a protrusion protruding from the first end portion of the first wall of the second groove section toward the claw portion.

With this additional feature, since the protrusion protruding toward the claw portion is provided, the claw portion is likely to catch on the protrusion, and the engageable member can be more effectively kept from coming off from the groove.

In the vehicle seat as described above with or without the aforementioned additional feature, the second groove section may extend laterally inward from the first groove section, and the claw portion may extend laterally inward from the body portion.

With this additional feature, when an occupant is seated on the vehicle seat, the outer covering is pulled laterally inward but when the outer covering is pulled laterally inward, the claw portion of the engageable member moves in such a direction that the claw portion catches on the second groove section; resultantly, the engageable member can be still more effectively kept from coming off from the groove.

In the vehicle seat as described above with or without the aforementioned additional features, the body portion may have slits arranged along a length of the engageable member, the slits being provided in a proximal end portion of the body portion.

With this additional feature, the engageable member is rendered flexible, i.e., easy to bend in accordance with the outer covering.

BRIEF DESCRIPTION OF THE DRAWINGS

The above and other aspects, other advantages and further features of the proposed apparatuses will become more apparent by describing in detail illustrative, non-limiting embodiments thereof with reference to the accompanying drawings, in which.

DESCRIPTION OF THE EMBODIMENTS

A description will now be given of one embodiment of a vehicle seat with reference to the drawings. In the following description, the terms front and rear, left and right (lateral), upper (upward) and lower (downward) are used to designate the relevant directions or relative positions with respect to the viewpoint of an occupant seated on the vehicle seat. The terms "laterally inward" and "laterally outward" are used to designate the relevant directions or relative positions with respect to the vehicle seat (i.e., "laterally inward" means a direction toward or a position closer to a plane passing through a center of the vehicle seat and extending in a direction perpendicular to a lateral direction of the vehicle seat, whereas "laterally outward" means a direction away from or a position farther than the plane passing through the center of the vehicle seat and extending in the direction perpendicular to the lateral direction of the vehicle seat).

Figure 1:
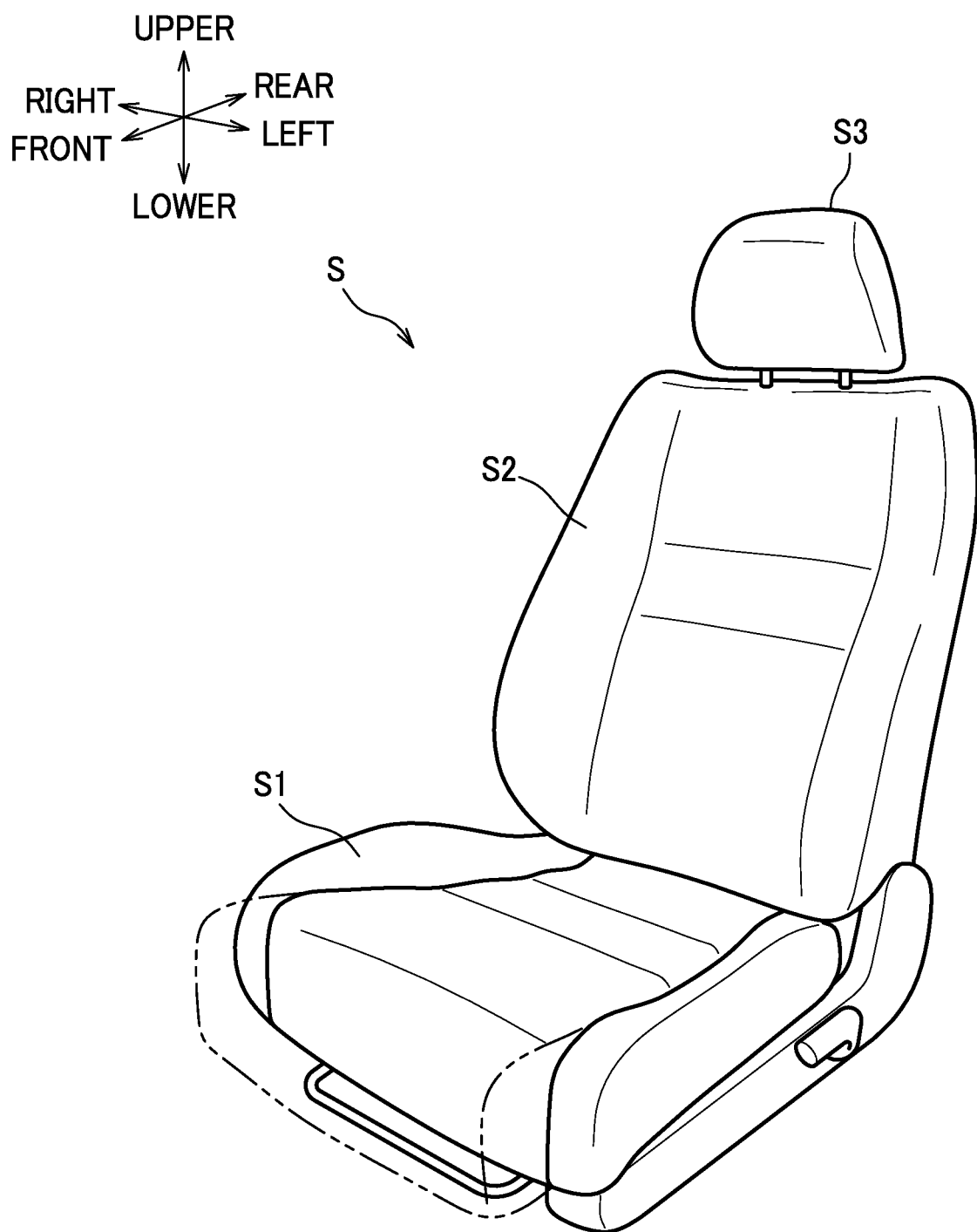
FIG. 1 is a perspective view showing an outer appearance of a car seat according to one illustrative, non-limiting embodiment.

As shown in FIG. 1, a car seat S, as an example of a vehicle seat, mainly includes a seat cushion S1, a seat back S2, and a headrest S3. The car seat S is configured such that a front end portion of the seat cushion S1 can be moved in a front-rear direction so that the length in the front-rear direction of the seating surface is rendered adjustable according to the physique of an occupant.

Figure 2:
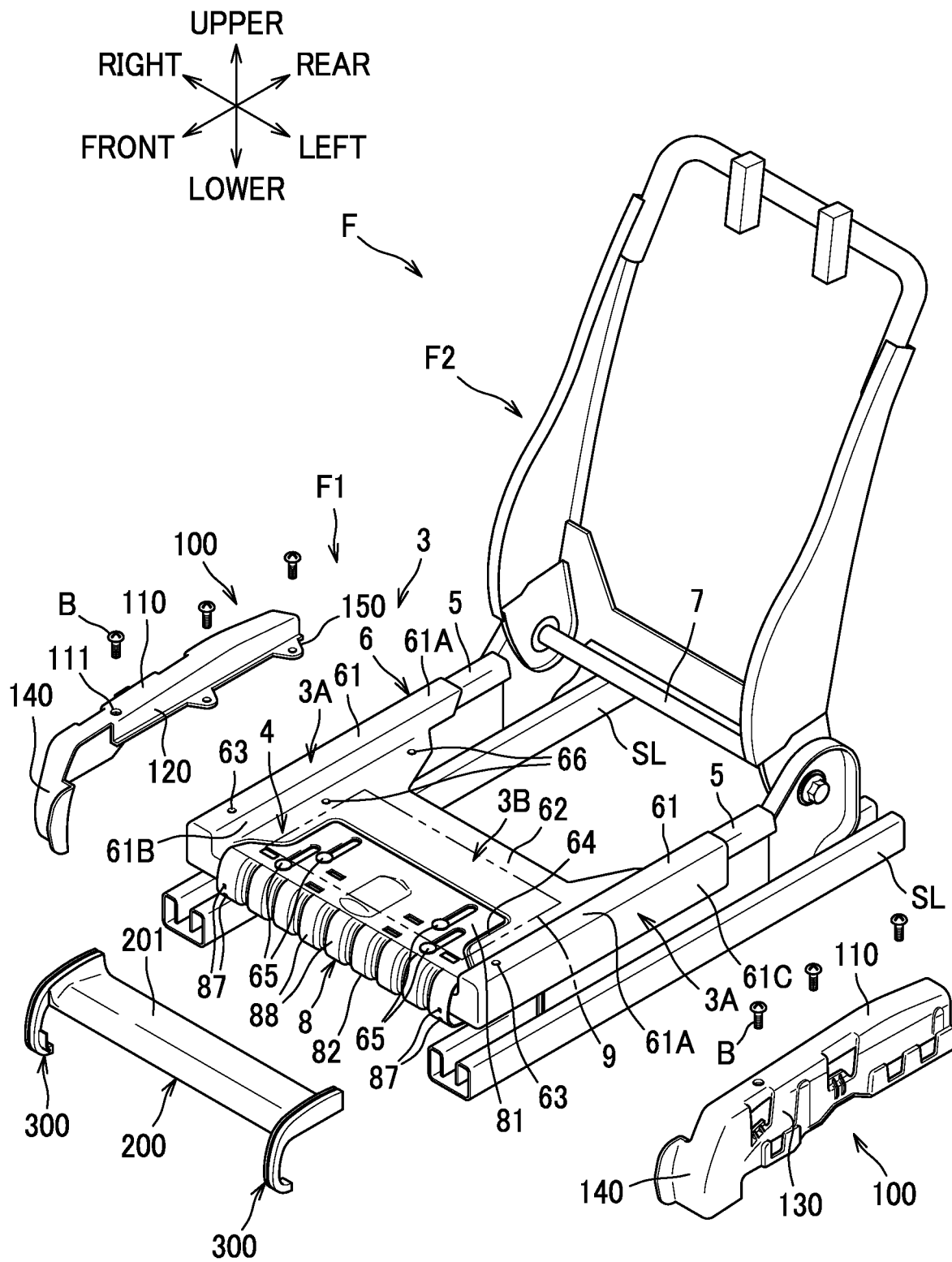
FIG. 2 is an exploded perspective view showing an overview of a seat frame.

The seat cushion S1 and the seat back S2 incorporate a seat frame F as shown in FIG. 2. The seat frame F mainly includes a cushion frame F1 and a seat back frame F2. The cushion frame F1 constitutes a frame of the seat cushion S1, and the seat back frame F2 constitutes a frame of the seat back S2.

Figure 3:
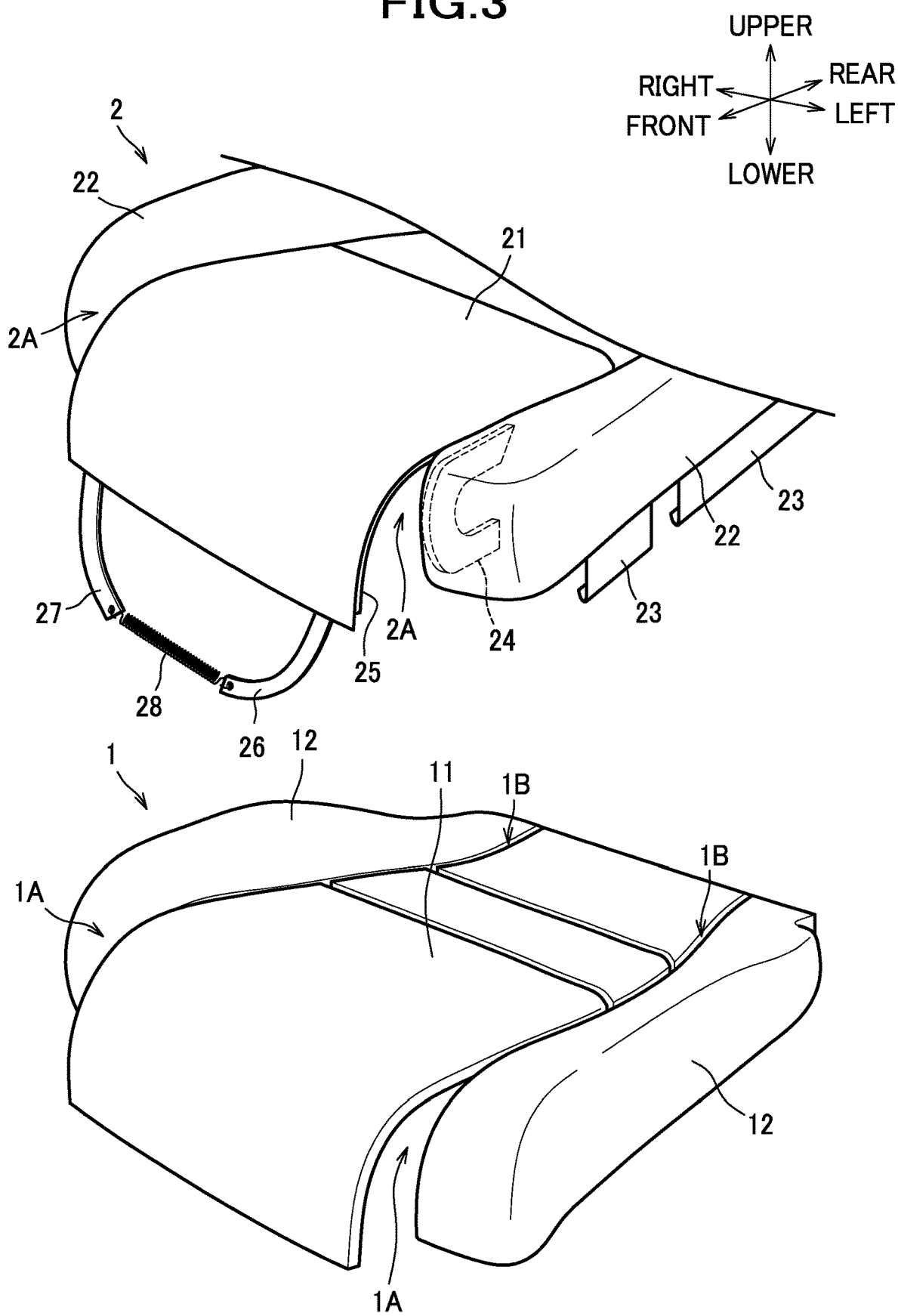
FIG. 3 is an exploded perspective view showing a cushion pad and an outer covering.

The seat cushion S1 includes a cushion pad 1 and an outer covering 2 as shown in FIG. 3. The seat cushion S1 is formed by upholstering the seat cushion frame F1 with the cushion pad 1 and the outer covering 2 with which the cushion pad 1 is covered.

As shown in FIG. 2, the cushion frame F1 is installed on a floor of an automobile (as an example of a car) via slide rails SL. In this way, the car seat S is rendered adjustable in the position in the front-rear direction.

The cushion frame F1 includes a stationary frame 3, a movable frame 4, and a plastic plate 9. The movable frame 4 is provided at a front end portion of the stationary frame 3.

The stationary frame 3 includes a pair of left and right side frames 3A, a plate-shaped pan frame 3B connecting the left and right side frames 3A, a connecting pipe 7 connecting rear end portions of the left and right side frames 3A, and a pair of left and right bolster covers 100.

The pair of left and right side frames 3A and the pan frame 3B are comprised of a pair of left and right support frames 5 and a plate-shaped connecting frame 6 connecting the pair of support frames 5.

Each of the support frames 5 is a metal frame extending in the front-rear direction. The pair of support frames 5 are in positions spaced out laterally from each other.

The connecting frame 6 includes left and right side frame portions 61 and a pan frame portion 62. The side frame portions 61 are laid on the support frames 5. The pan frame portion 62 is a plate-shaped portion extending between the left and right side frame portions 61. The side frame portions 61 of the connecting frame 6 are fixed respectively to the support frames 5 by welding or the like.

In this embodiment, the pair of support frames 5 and the left and right side frame portions 61 of the connecting frame 6 constitute the pair of left and right side frames 3A, whereas the pan frame portion 62 of the connecting frame 6 constitutes the pan frame 3B connecting the pair of side frames 3A.

Each of the side frame portions 61 is so shaped substantially like a letter U in cross section as to cover the corresponding support frame 5, and extends from a rear end portion of the support frame 5 frontward up to a position beyond a front end of the support frame 5. To be more specific, the side frame portion 61 includes an upper side frame portion 61A disposed above the support frame 5, an inner side frame portion 61B extending from a laterally inner end of the upper side frame portion 61A downward and disposed at a laterally inner side of the support frame 5, and an outer side frame portion 61C extending from a laterally outer end of the upper side frame portion 61A downward and disposed at a laterally outer side of the support frame 5. The side frame portion 61 has a first fixing hole 63 formed in a front end portion of the upper side frame portion 61A.

The pan frame portion 62 connects lower ends of the left and right inner side frame portions 61B. The pan frame portion 62 includes, at a front end thereof, a movable frame support portion 64.

The movable frame support portion 64 has a recessed shape contoured to fit the movable frame 4, and opens to the front. The movable frame support portion 64 includes four guide protrusions 65 protruding upward.

The pan frame portion 62 has four second fixing holes 66, of which two are aligned in front and behind and disposed at a left end portion of the pan frame portion 62, and the other two are aligned in front and behind and disposed at a right end portion of the pan frame portion 62. Although the pair of second fixing holes 66 at the left end portion are not shown in FIG. 2, they are provided in positions symmetric to those of the pair of second fixing holes 66 at the right end portion.

The bolster covers 100 are members configured to form bank portions having a desired height at the left and at the right of the cushion frame F1. Each of the bolster covers 100 is disposed on the corresponding side frame 3A, specifically, on the corresponding side frame portion 61 of the connecting frame 6.

Figure 12A:
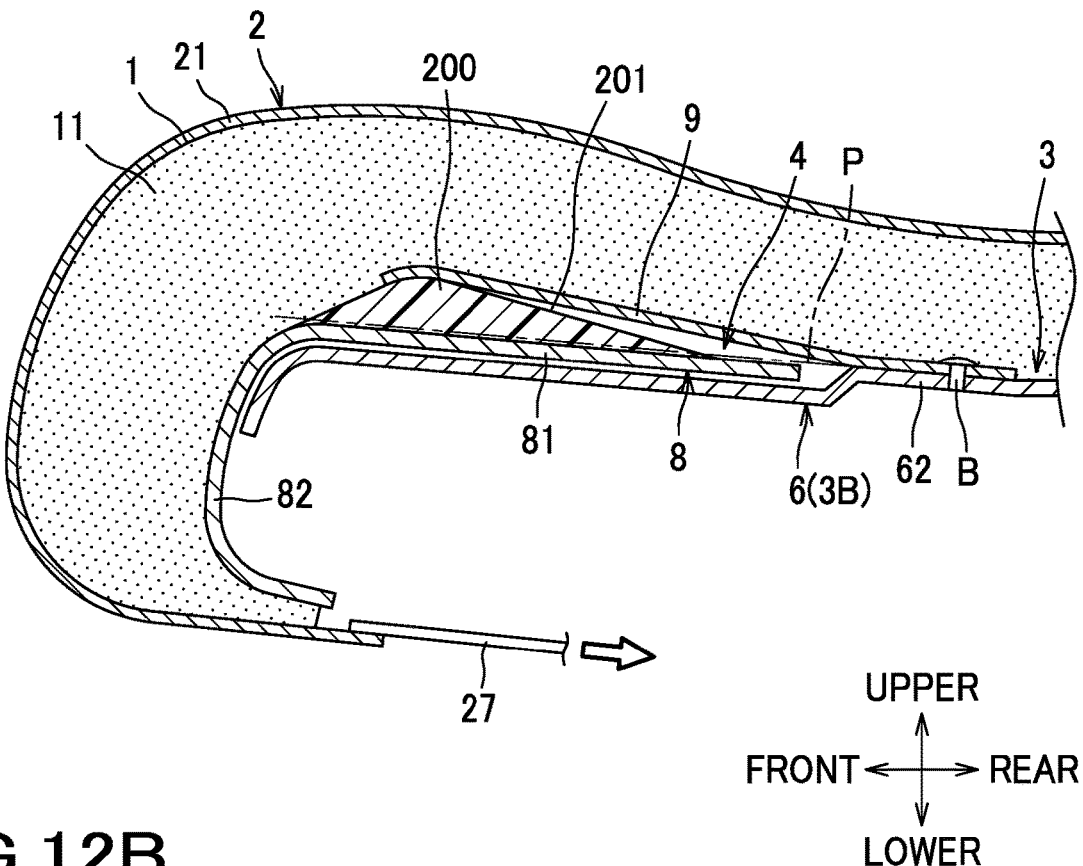
FIG. 12A is a section view showing the front end portion of the seat cushion in which the movable frame is in the first position.
Figure 12B:
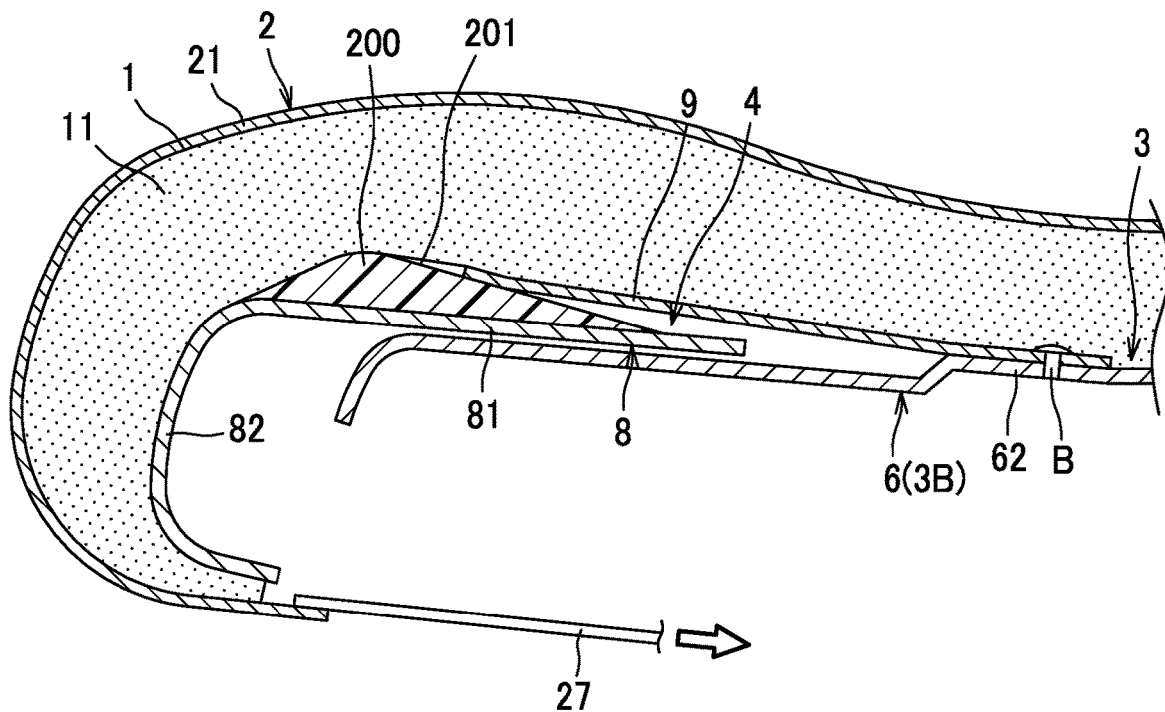
FIG. 12B is a section view showing the front end portion of the seat cushion in which the movable frame is in the second position.

The movable frame 4 is provided movably in the front-rear direction relative to the stationary frame 3. To be more specific, the movable frame 4 is configured to be slidable frontward and rearward between a first position that is a rearmost position of the movable frame 4 as shown in FIG. 12A, and a second position that is frontward of the first position as shown in FIG. 12B. Referring back to FIG. 2, the movable frame 4 includes a body frame 8, a carrier cover 200 and a pair of left and right side covers 300. The carrier cover 200 and the side covers 300 are attached to the body frame 8.

The body frame 8 consists, for example, of a metal plate. It is to be understood that the body frame 8 may be of plastic. The body frame 8 includes a flat plate portion 81 disposed on the movable frame support portion 64 of the connecting frame 6, and a bent portion 82 extending from a front end of the flat plate portion 81 downward at a front side of the connecting frame 6, and then bent to extend rearward.

The bent portion 82 includes a plurality of projections 88 elongated in an upward-downward direction. The plurality of projections 88 are arranged laterally at the outer surface of the bent portion 82 so that slip between the cushion pad 1 and the bent portion 82 is improved. The bent portion 82 also has four fourth engageable holes 87. One pair of the fourth engageable holes 87 are arranged one above the other and disposed at a left end portion of the bent portion 82. The other pair of the fourth engageable holes 87 are arranged one above the other and disposed at a right end portion of the bent portion 82.

The carrier cover 200 is a plastic member fixed on the flat plate portion 81 of the body frame 8. The side covers 300 are plastic members disposed at the left and right sides of the carrier cover 200.

The plastic plate 9 is a plate-shaped member made of plastic with flexibility. The plastic plate 9 extends continuously from a position over the pan frame 3B to a position over the movable frame 4. The plastic plate 9 laterally spans continuously from the left end portion to the right end portion of the pan frame 3B. Provision of the plastic plate 9 in this manner serves to smoothly connect regions different in level with a sharp drop or rise like a step provided on the surface between the pan frame 3B and the movable frame 4, thereby improving the comfort of an occupant seated on the car seat S.

Since the plastic plate 9 is made of plastic that may be soft, pliable and flexible, the upper surface of the pan frame 3B and the upper surface of the movable frame 4 can be connected smoothly.

The plastic plate 9 is, as shown in FIG. 12A, disposed under the cushion pad 1, and has a rear end portion thereof fixed to the pan frame 3B by screws B.

A description will now be given of a detailed construction of the bolster covers 100.

As shown in FIG. 2, the bolster covers 100 are made of plastic, and each formed in an elongate shape that is longer in the front-rear direction. Each of the bolster covers 100 includes an upper wall portion 110 disposed over the side frame portion 61, an inner wall portion 120 disposed at a laterally inner side of the side frame portion 61, an outer wall portion 130 disposed at a laterally outer side of the side frame portion 61, and a front wall portion 140 disposed at a front side of the side frame portion 61. The left and right bolster covers 100 have shapes substantially symmetric to each other; therefore, in FIGS. 4 and 5, the right bolster cover 100 only is illustrated.

Figure 4A:
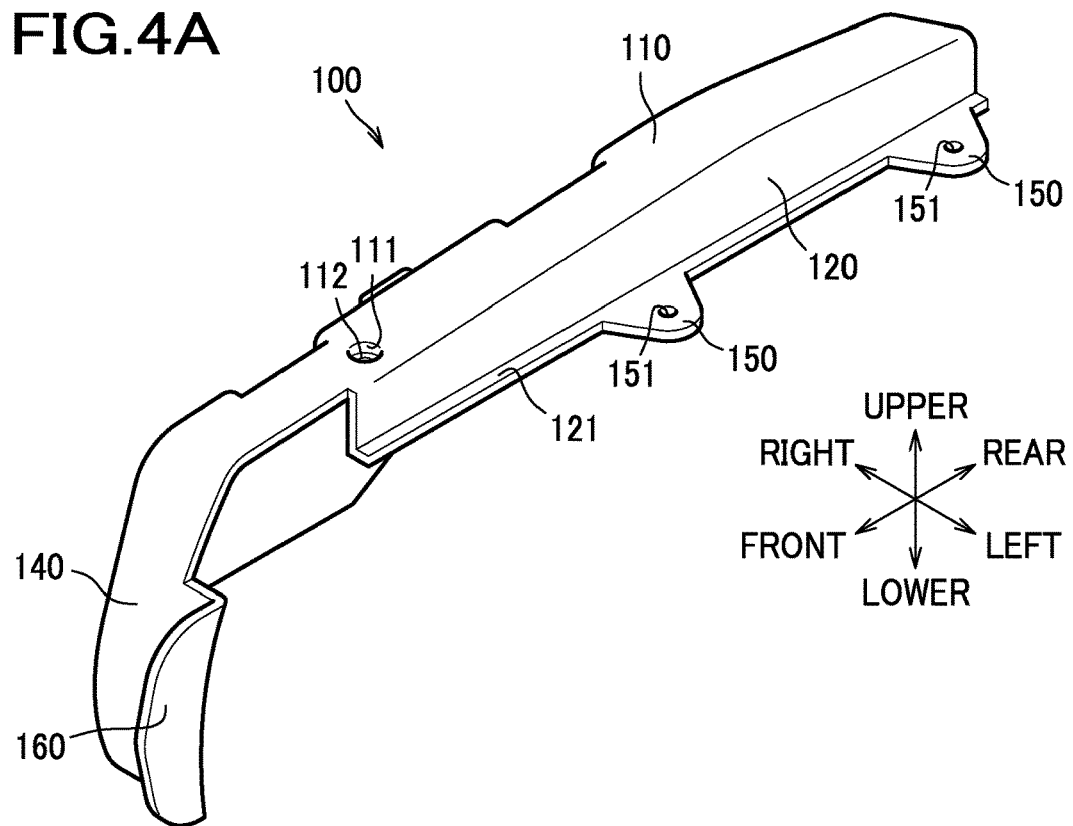
FIG. 4A is a perspective view showing a right bolster cover as viewed from the left side.
Figure 5:
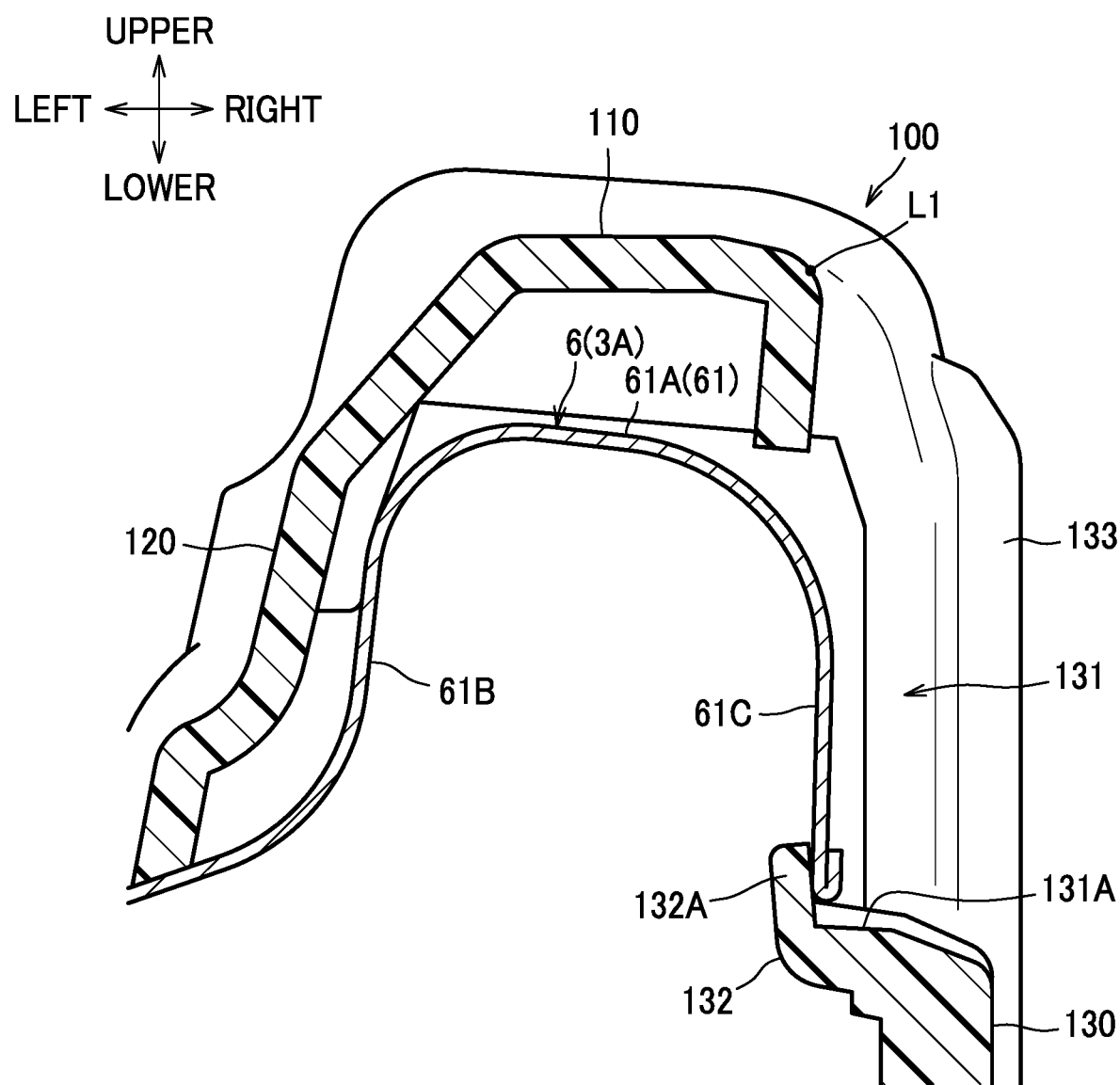
FIG. 5 is a section view showing a side frame and the right bolster cover taken along a plane containing a section of an engageable portion.

As shown in FIG. 4A, the upper wall portion 110 has, at a front end portion thereof, a front fixing portion 111. The front fixing portion 111 is a circular recessed portion with a bottom having a front fixing hole 112 piercing in the upward-downward direction.

The inner wall portion 120 extends from a laterally inner end of the upper wall portion 110 downward. The inner wall portion 120 includes an inner ledge 121. The inner ledge 121 extends laterally inward from a lower end of the inner wall portion 120.

The inner wall portion 120 includes two inner fixing portions 150. One of the inner fixing portions 150 is disposed at a rear end portion of the inner wall portion 120. The other of the inner fixing portions 150 is disposed at a middle portion, in the front-rear direction, of the inner wall portion 120. Each inner fixing portion 150 is configured as a plate-shaped portion extending laterally inward from the inner ledge 121 and having top and bottom faces (facing upward and downward, respectively). The inner fixing portion 150 has an inner fixing hole 151 piercing in the upward-downward direction.

Figure 4B:
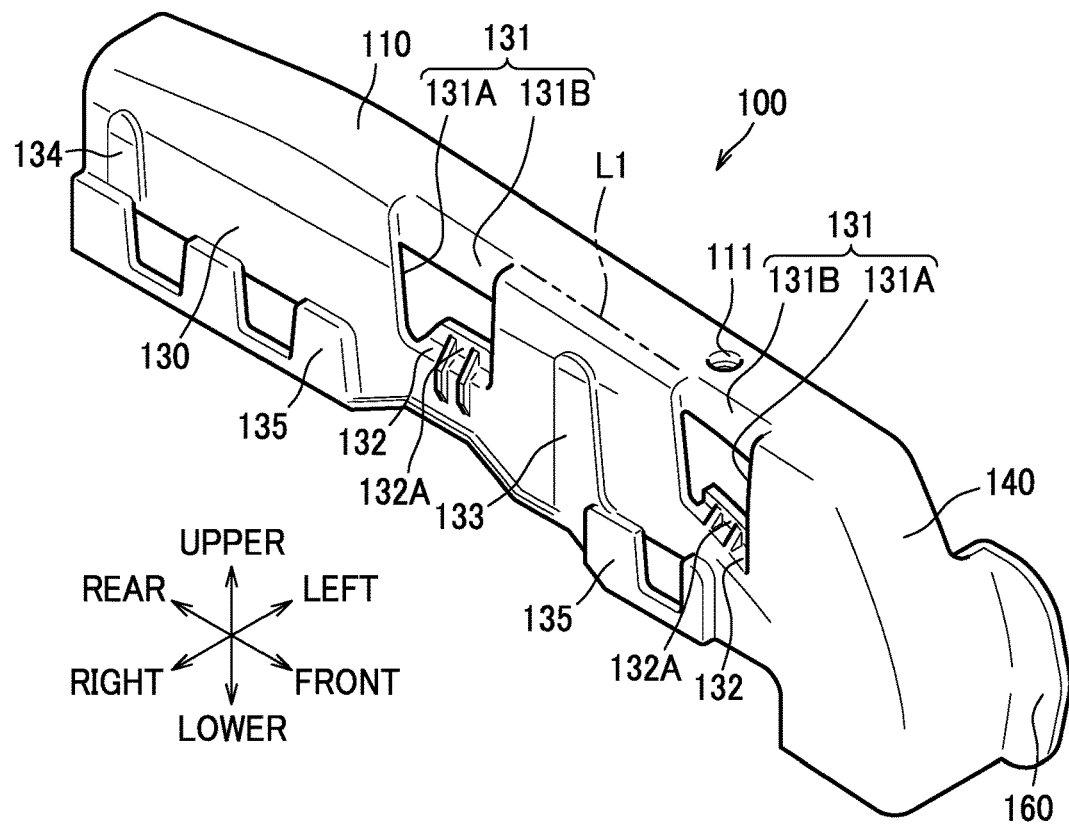
FIG. 4B is a perspective view showing the right bolster cover as viewed from the right side.

As shown in FIG. 4B, the outer wall portion 130 extends from the laterally outer end of the upper wall portion 110 downward. The outer wall portion 130 includes two openings 131, two engageable portions 132 each provided at an edge of the corresponding opening 131, a first reinforcing portion 133 provided in a position between the two openings 131, a second reinforcing portion 134, and J-hook engageable portions 135. The second reinforcing portion 134 is provided in a rear end portion of the outer wall portion 130. The J-hook engageable portions 135 are provided in a lower end portion of the outer wall portion 130.

The openings 131 are formed in the outer wall portion 130. One of the openings 131 is disposed at a front end portion of the outer wall portion 130, and the other is disposed at a middle portion, in the front-rear direction, of the outer wall portion 130. Each opening 131 includes a through hole 131A piercing through the outer wall portion 130 in the lateral direction, and a recessed portion 131B formed at an upper edge of the through hole 131A. The recessed portion 131B is recessed laterally inwardly and opens upward. In other words, the upper edge of the opening 131 is positioned at the upper wall portion 110.

The engageable portions 132 extend from a lower edge of each opening 131 laterally inwardly, i.e., toward the side frame portion 61. Each engageable portion 132 includes an engageable tab 132A. The engageable tab 132A extends upward from an inner end of the laterally inwardly extending portion of the engageable portion 132.

Each of the first reinforcing portion 133 and the second reinforcing portion 134 is configured as a bead bent to bulge outwardly in the outer wall portion 130, and extends in the upward-downward direction. The first reinforcing portion 133 is provided below a phantom line L1 joining the upper edges (provided at the upper wall portion 110) of the two adjacent openings 131.

Provision of this first reinforcing portion 133 between the two openings 131 serves to enhance the rigidity of the outer wall portion 130 having the plurality of openings 131 provided therein. Furthermore, the bead-shaped configurations of the first reinforcing portion 133 and the second reinforcing portion 134 make it possible to provide reinforcing portions with a simple construction.

The J-hook engageable portions 135 are portions each bent to bulge laterally outwardly in the outer wall portion 130. One of the J-hook engageable portions 135 is provided in a front end portion of the outer wall portion 130 and the other is provided in a rear end portion of the outer wall portion 130. The front J-hook engageable portion 135 is disposed frontward of the first reinforcing portion 133, and the rear J-hook engageable portion 135 is disposed rearward of the first reinforcing portion 133. In other words, the first reinforcing portion 133 is provided in a position between these two J-hook engageable portions 135. The rear opening 131 (the opening 131 disposed in the middle portion of the outer wall portion 130) is provided in a position between the two J-hook engageable portions 135.

The front wall portion 140 is configured to extend from the front end of the upper wall portion 110 downward. The front wall portion 140 has a laterally outer end joined to the front end of the outer wall portion 130. The front surface of the front wall portion 140 inclines rearward with respect to the upward-downward direction such that it is disposed farther rearward with increasing distance from a lower end toward upward. The front wall portion 140 includes a front protrusion 160 protruding toward frontward. In other words, the bolster cover 100 includes the front protrusion 160, which is provided at a front end portion of the bolster cover 100.

The front protrusion 160 is formed as a plate thinner than a lateral width of the bolster cover 100, and extends from a laterally inner end of the front wall portion 140 toward frontward. The upper end of the front protrusion 160 is provided in a position lower than the upper wall portion 110. With this configuration, the bolster cover 100 only protrudes at the laterally inner front protrusion 160 toward frontward, and thus the laterally outer portion of the front end portion of the seat cushion S1 is configured to be soft, so that when an occupant getting on and off the car seat S, his/her leg and any other part is unlikely to get snagged on the laterally outer portion of the front end portion of the seat cushion S1.

The bolster cover 100 configured as described above is, as shown in FIG. 5, attached to the side frame 3A. To be more specific, the engageable portion 132 extends from the outer wall portion 130, lying under the outer side frame portion 61C of the side frame portion 61, to a laterally inner side of the outer side frame portion 61C. The engageable tab 132A of the engageable portion 132 engages with the lower edge of the outer side frame portion 61C.

Since the first reinforcing portion 133 is provided below the phantom line L1 joining the upper edges of the two adjacent openings 131, the outer wall portion 130 can be bent for engagement of the engageable portion 132 with the outer side frame portion 61C with increased ease in comparison with an alternative configuration in which the first reinforcing portion 133 is provided across the phantom line L1.

Since the engageable portion 132 extends from the edge of the opening 131, the state of engagement of the outer side frame portion 61C with the engageable portion 132 can be visually inspected through the opening 131.

Figure 9A:
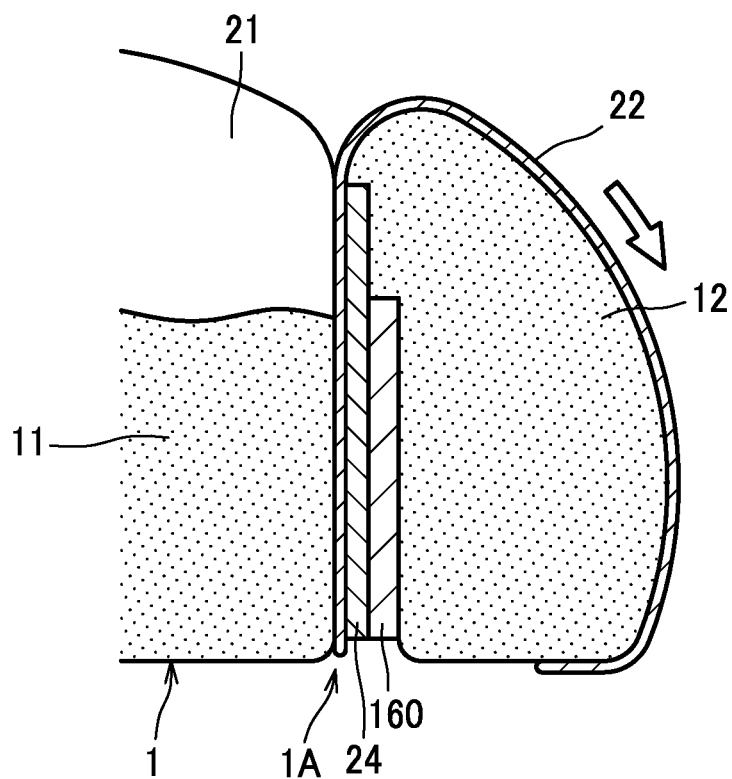
FIG. 9A is a section view showing the outer covering, the cushion pad and the bolster cover taken along a plane containing a movement restriction plate and a front protrusion.
Figure 9B:
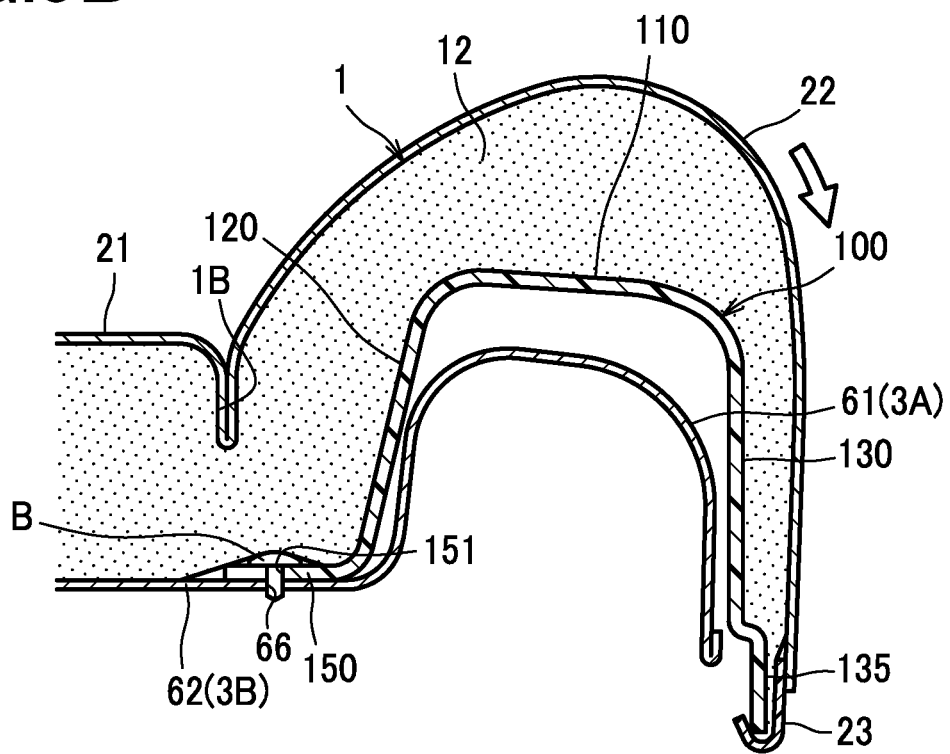
FIG. 9B is a section view showing a connecting frame, the outer covering, the cushion pad and the bolster cover taken along a plane containing a J hook and an inner fixing portion.

As shown in FIG. 9B, the inner fixing portions 150 lie on the pan frame 3B (i.e., on the pan frame portion 62 of the connecting frame 6). The upper surface of each inner fixing portion 150 is parallel to the upper surface of the pan frame portion 62. This makes it possible to obviate the potential discomfort an occupant would feel, in comparison with an alternative configuration in which the inner fixing portion 150 has a bulging portion.

The inner fixing portions 150 are fixed on the pan frame portion 62 by screws B inserted through the inner fixing holes 151 of the inner fixing portions 150 and the second fixing holes 66 of the pan frame 62. With this configuration, the bolster cover 100 can be fixed with a part on which the weight of an occupant is put from above; therefore, the bolster cover 100 can be fixed securely. Because the inner fixing portions 150 lie on the pan frame 3B, the weight of an occupant is likely to be received by the inner fixing portions 150, and thus the bolster cover 100 can be securely fixed to the pan frame portion 62.

As shown in FIG. 2, the front fixing portion 111 is fixed on an upper surface of the side frame 61 of the connecting frame 6, i.e., on an upper surface of the side frame 3A, by a screw inserted through the front fixing hole 112 and the first fixing hole 63 of the side frame portion 61. Since the buttocks of occupants vary in size with the individual, it may be preferable that the bolster cover 100 be allowed to deform so that the upper wall portion 110 thereof shift slightly in the laterally outward directions to accommodate large buttocks. This is achieved, in this embodiment, by fixing the bolster cover 100 to the side frame 3A only at the front end portion of the bolster cover 100, but not at the rear end portion of the bolster cover 100 which may contact the buttocks of the occupant. Such laterally outward deformation of the bolster covers 100 which slightly widen the space between the left and right upper wall portions 110 at the rear end portion would help suppress a tight, cramped feel the occupant may have in his/her buttocks.

As described above, the bolster cover 100 is fixed to the side frame 3A or the pan frame 3B of the stationary frame 3 only at the front fixing portion 111 and two inner fixing portions 150, while the rear end portion of the upper wall portion 110 and the outer wall portion 130 are not fixed to the side frame 3A or the pan frame 3B by screws or the like. Since the laterally outer side portion of the bolster cover 100 is not fixed at all, a force received from an occupant by the bolster cover 100 can be relieved to the laterally outward direction.

Next, a detailed description will be given of structural features of the body frame 8, the carrier cover 200, and side covers 300 which constitute the movable frame 4.

Figure 6A:
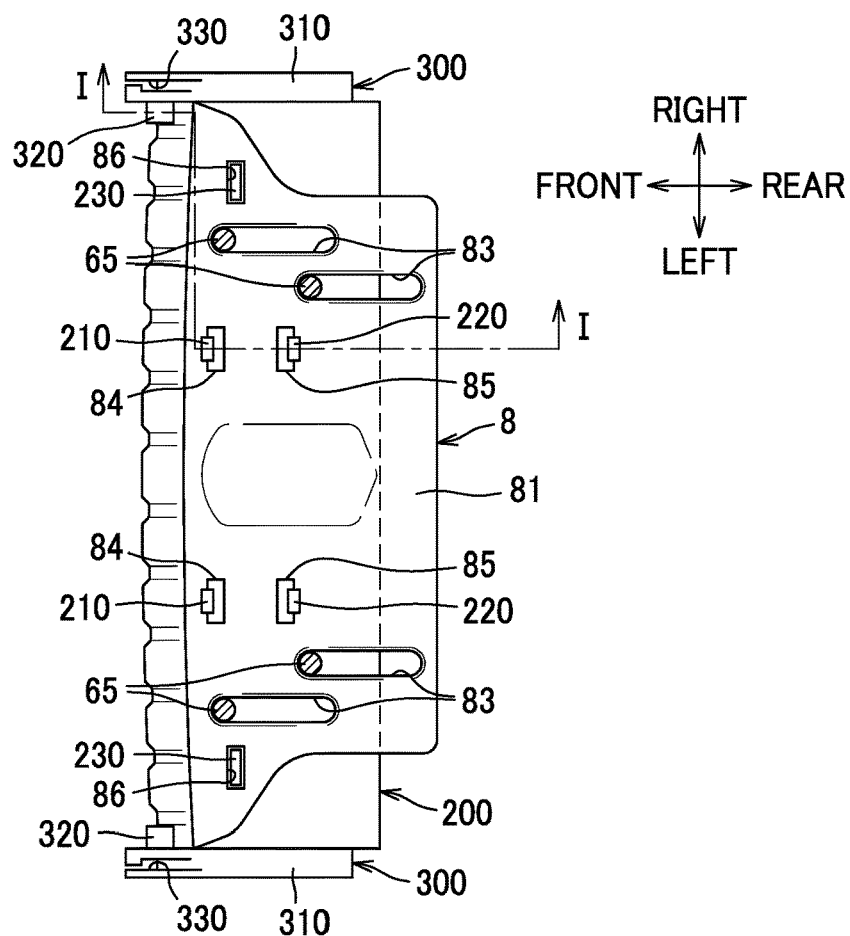
FIG. 6A is a bottom view showing a movable frame.

The flat plate portion 81 of the body frame 8 has an upper surface formed substantially parallel to the upper surface of the pan frame portion 62 of the connecting frame 6. As shown in FIG. 6A, the flat plate portion 81 includes a plurality of guide slots 83 extending in the front-rear direction. In the guide slots 83, guide projections 65 of the connecting frame 6 are disposed. With these features, the body frame 8 is configured to move in the front-rear direction along the direction of extension of the guide slots 83 as the guide projections 65 inside the guide slots 83 can move relative to the guide slots 83.

The flat plate portion 81 has, at an upper surface thereof, two first engageable holes 84, two second engageable holes 85, and two third engageable holes 86. The first engageable holes 84 are provided in the front end portion of the flat plate portion 81. The second engageable portions 85 are provided in positions rearwardly of the corresponding first engageable holes 84, respectively. The third engageable holes 86 are provided in left and right end portions of the flat plate portion 81.

Figure 6B:
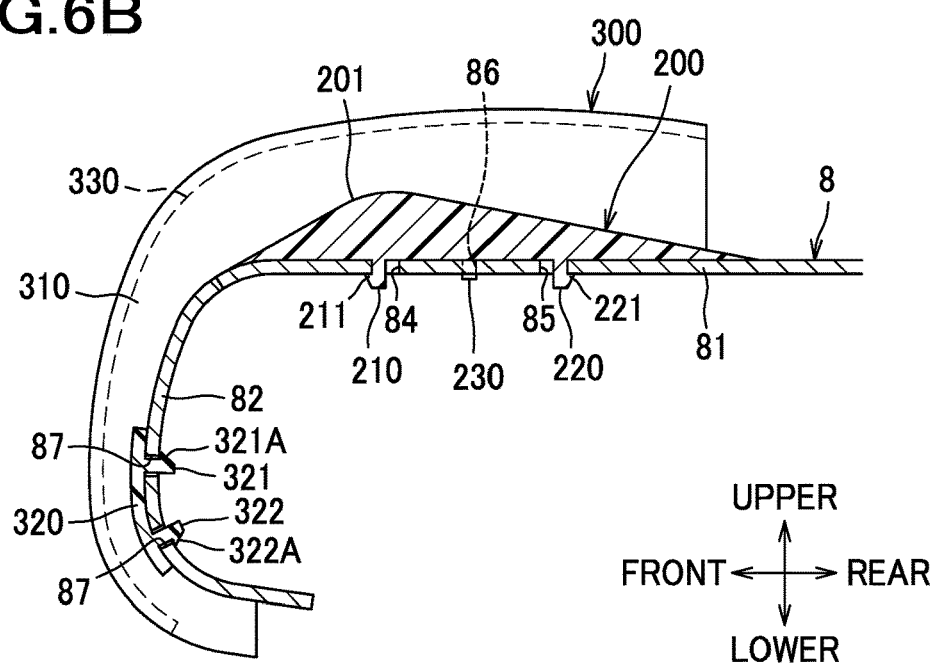
FIG. 6B is a section view showing the movable frame taken along the line I-I of FIG. 6A.

As shown in FIG. 6B, the carrier cover 200 is a member having a bulge to be provided on the flat plate portion 81, and has a curved surface 201 protruding upwardly. To be more specific, the carrier cover 200 rises with increasing distance from a rear end thereof frontward, and lowers with increasing distance from an uppermost portion thereof toward a front end thereof. The carrier cover 200 protrudes upward beyond an extended plane P of the upper surface of the pan frame portion 62 (see FIG. 12A). The uppermost portion of the carrier cover 200 is provided frontwardly of a center of the carrier cover 200 in the front-rear direction. By virtue of this carrier cover 200 provided on the flat plate portion 81, thighs of an occupant can be properly supported.

As shown in FIG. 2, the curved surface 201 of the carrier cover 200 has a laterally elongate shape extending along the length from the left end to the right end of the flat plate portion 81. With this configuration, the thighs of an occupant can be supported more comfortably in comparison with an alternative configuration in which the curved surface 201 is provided partly in the lateral direction.

Since the curved surface 201 is provided on the carrier cover 200, the curved surface can be provided on the movable frame 4 with increased ease in comparison with an alternative configuration in which such a curved surface is provided on the upper surface of the body frame 8.

Particularly, in this embodiment, the carrier cover 200 is made of plastic and the body frame 8 is made of metal; therefore, the curved surface 201 can be provided on the carrier cover 200 more easily than on the body frame 8. Moreover, provision of the plastic carrier cover 200 on the metal body frame 8 serves to reduce noise which would be produced when the cushion pad 1 and the movable frame 4 rub against each other.

As shown in FIG. 6A, the carrier cover 200 has an undersurface, and includes two first hooks 210, two second hooks 220, and two engageable bosses 230, all of which are provided at the undersurface of the carrier cover 200. The first hooks 210 are provided at a front end portion of the carrier cover 200 and arranged side by side in the lateral direction. Each first hook 210 protrudes downward and includes a first claw 211 extending frontward. The first claw 211 is provided at a distal end portion of the first hook 210. The second hooks 220 are provided rearwardly of the first hooks 210, respectively. Each second hook 220 protrudes downward and includes a second claw 221 extending rearward, i.e., in a direction opposite to the direction in which the first claw 211 of the first hook 210 extends. The second claw 221 is provided at a distal end portion of the second hook 220. The engageable bosses 230 are provided at left and right end portions of the carrier cover 200, and protrude downward.

As shown in FIG. 6B, the first hook 210 engages with the first engageable hole 84 of the body frame 8. The first claw 211 of the first hook 210 hooks on the edge of the first engageable hole 84. The second hook 220 engages with the second engageable hole 85. The second claw 221 of the second hook 220 hooks on the edge of the second engageable hole 85. The engageable boss 230 engages in the third engageable hole 86.

In this manner, the carrier cover 200 is fixed to the body frame 8 in a simple construction only by engaging the first hooks 210, second hooks 220 and engageable bosses 230 provided on the carrier cover 200 with the holes 84, 85, 86 of the body frame 8.

Moreover, since the claws 211, 221 at the distal end portions of the first hooks 210 and the second hooks 220 are hooked on the edges of the holes 84, 85 of the body frame 8, the engagement of the first hooks 210 with the body frame 8 and engagement of the second hooks 220 with the body frame 8 are rendered unlikely to disengage.

As shown in FIGS. 6A, 6B, the side covers 300 each include a side cover body 310 and a flange portion 320 both of which are provided along the outer surface of the body frame 8. The side cover body 300 extends from an upper side of the body frame 8, along a front side of the body frame 8, up to an underside of the body frame 8. The flange portion 320 extends from the side cover body 310 laterally inward.

The side cover body 310 has a groove 330. The groove 330 extends from an upper surface of the side cover body 310, through a front surface of the side cover body 310, and to an undersurface of the side cover body 310. The configuration of the groove 330 will be described later in detail.

As shown in FIG. 6B, the flange portion 320 is formed along the surface of the body frame 8. The flange portion 320 includes a third hook 321 and a fourth hook 322 which are arranged in a direction perpendicular to the lateral direction (in the present embodiment, the third and fourth hooks 321, 322 are arranged in the upward-downward direction). The third hook 321 and the fourth hook 322 protrude from the flange portion 320 on the body frame 8 side. The third hook 321 includes a third claw 321A protruding upward. The third claw 321A is provided at the distal end portion of the third hook 321. The fourth hook 322 is provided under the third hook 321, and includes a fourth claw 322A protruding downward, i.e., in a direction opposite to the direction in which the third claw 321A protrudes. The fourth claw 322A is provided at the distal end portion of the fourth hook 322.

The third hook 321 engages with the upper fourth engageable hole 87 of the body frame 8. The third claw 321A of the third hook 321 is hooked on the edge of the fourth engageable hole 87. The fourth hook 322 engages with the lower fourth engageable hole 87 of the body frame 8. The fourth claw 322A of the fourth hook 322 is hooked on the edge of the fourth engageable hole 87.

Provision of the third hook 321 and the fourth hook 322 in the flange portion 320 provides a simple construction by which the side cover 300 can be fixed to the body frame 8.

Since the third hook 321 and the fourth hook 322 are arranged in the upward-downward direction, the side cover 300 can be fixed securely to the body frame 8 without enlarging the flange portion 320 in the lateral direction.

Next, a description will be given of a detailed configuration of the cushion pad 1 and the outer covering 2.

As shown in FIG. 3, the cushion pad 1 is made of a cushiony material such as urethane foam. The cushion pad 1 includes a center portion 11 for an occupant to be seated thereon, and left and right side portions 12 provided, respectively, at the left and right sides of the center portion 11.

The center portion 11 is a portion laid over the pan frame portion 62 of the connecting frame 6 and the movable frame 4. The side portions 12 are portions configured to cover the side frames 3A and the bolster covers 100. The cushion pad 1 has a first slit 1A provided between the center portion 11 and each of the side portions 12, i.e., in a position laterally inward of the side frame 3A. The first slit 1A extends from a front end of the cushion pad 1 rearward. The center portion 11 is longer than the side portions 12 and extends farther frontward beyond the front ends of the side portions 12.

The center portion 11 is provided, as shown in FIG. 12, to extend frontward from an upper side of the pan frame 3B and configured to wrap around the front end portion of the movable frame 4.

As shown in FIG. 3, the cushion pad 1 has a tuck-in groove 1B provided between the center portion 11 and each of the side portions 12. The tuck-in groove 1B is a groove recessed down from the upper surface of the cushion pad 1. The tuck-in groove 1B is disposed rearward of the first slit 1A and extends in the front-rear direction. An outer covering attachment member (not shown) for tucking in the outer covering 2 is provided at a bottom of the tuck-in groove 1B.

As shown in FIG. 9B, the side portion 12 is configured to bulge upward beyond an upper side of the center portion 11. The tuck-in groove 1B is provided inwardly in the lateral direction relative to the lateral position of the inner fixing portion 150 of the bolster cover 100. In other words, the inner fixing portion 150 is provided on a laterally outer side relative to a position directly under the tuck-in groove 1B. Similarly, a screw B by which the inner fixing portion 150 is fixed to the pan frame 3B is in a position directly under the tuck-in groove 1B or on a laterally outer side relative to the position directly under the tuck-in groove 1B. This position of the screw B serves to suppress the potential discomfort an occupant would feel.

Returning to FIG. 3, the outer covering 2 is made of a synthetic leather, fabrics or the like. The outer covering 2 includes a center cover 21 disposed to cover the center portion 11 of the cushion pad 1, and left and right side covers 22 disposed, respectively, at left and right sides of the center portion 11 to cover the left and right side portions 12 of the cushion pad 1. The outer covering 2 has a second slit 2A provided between the center cover 21 and each of the left and right side covers 22, i.e., in a position laterally inward of the side frame 3A. The second slit 2A extends from the front end of the outer covering 2 rearward.

The center cover 21 extends farther frontward beyond the front ends of the side covers 22. This center cover 21 is configured to extend frontward from an upper side of the pan frame 3B and configured to wrap around a front end portion of the movable frame 4, as shown in FIG. 12.

Referring back to FIG. 3, left and right engageable members 25 are provided, respectively, on front portions of the left and right end portions of the center cover 21 (i.e., portions extending beyond the front ends of the side covers 22). The left and right engageable members 25 are members like a trim cord that has an elongate shape extending along the left and right end portions of the center cover 21. At the front end of the center cover 21, a first strap 26 and a second strap 27 are provided. The first strap 26 and the second strap 27 are connected to each other via a spring 28.

Left and right movement restriction plates 24 are provided at laterally inner end portions of the front end portions of the left and right side covers 22, respectively. Each side cover 22 includes a J hook 23. The J hook 23 is provided at a laterally outer end portion of the side cover 22.

The movement restriction plate 24 is shaped like a letter U and disposed such that the letter U opens rearward. The movement restriction plate 24 is fixed to the inner end portion (i.e., the side on which the second slit 2A is provided) of the front end portion of the side cover 22.

As shown in FIG. 9A, the front protrusion 160 of the bolster cover 100 is disposed in the first slit 1A of the cushion pad 1. The front protrusion 160 is disposed adjacent to the movement restriction plate 24 in a position laterally outward of the movement restriction plate 24.

As shown in FIG. 9B, the J hook 23 is fixed to the laterally outer end portion of the side cover 22. The J hook 23 is shaped substantially like a letter J that extends downward from the side cover 22 and is bent laterally inwardly. The J hook 23 is engaged with the lower edge of the J hook engageable portion 135 of the bolster cover 100. Thus, the outer covering 2 is pulled down at both of the left and right end portions (see arrow in FIGS. 9A and 9B).

As the left and right end portions of the outer covering 2 are pulled down, the cushion pad 1 under the outer covering 2 is also pulled in the lateral direction; however, in the present embodiment, the movement restriction plate 24 is brought into contact with the front protrusion 160 of the bolster cover 100 that is disposed at the laterally outer side of the movement restriction plate 24, and the movement of the outer covering 2 in the lateral direction is restricted. Accordingly, the side portion 12 is restrained from being pulled in the lateral direction, so that the front end portion of the cushion pad 1 can be kept in shape.

By providing the front protrusion 160 as an engageable portion (with which the movement restriction plate 24 is engageable) in the bolster cover 100, such an engageable portion can be provided in the cushion frame F1 with a simple construction.

Figure 7:
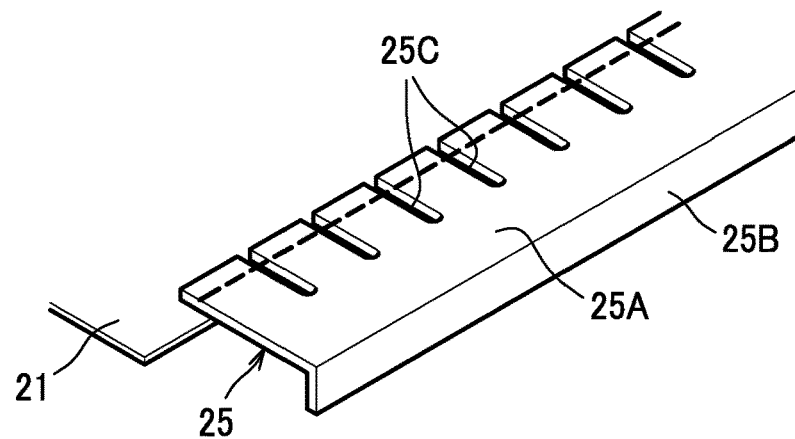
FIG. 7 is a perspective view showing an engageable member.

The engageable members 25 provided at the center cover 21 include a body portion 25A and a hook tab 25B, as shown in FIG. 7. The body portion 25A is an elongate plate-shaped portion extending along each of the left and right end portions of the center cover 21. The hook tab 25B is an example of a claw portion extending from the distal end (the protruding end protruding from the center cover 21) of the body portion 25A in a direction different from the protruding direction of the body portion 25A. Each engageable member 25 has a substantially L-shaped cross section with the body portion 25A and the hook tab 25B. The portion of the body portion 25A at an end (proximal end) opposite to the distal end from which the hook tab 25B extends (i.e., the proximal end portion of the body portion 25A of the engageable member 25) is fixed to the center cover 21 by sewing.

The body portion 25A has slits 25C provided in the proximal end portion of the body portion 25A (the proximal end portion is the portion fixed to the center cover 21). The slits 25C of the body portion 25A are arranged along the length of the engageable member 25. Provision of such slits 25C renders the engageable member 25 flexible, i.e., easy to bend in accordance with the center cover 21.

Figure 8:
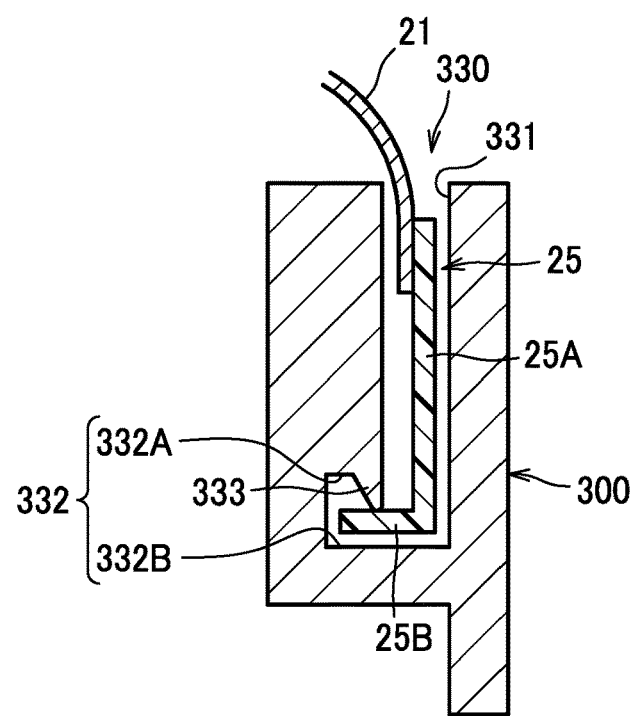
FIG. 8 is a section view showing a side cover and the engageable member.

The engageable member 25 is, as shown in FIG. 8, inserted in the groove 330 provided in the side cover 300 of the movable frame 4.

Hereinafter, a detailed description will be given of the specific construction of the groove 330.

The groove 330 includes a first groove section 331 extending deep in a direction away from the outer covering 2, and a second groove section 332 extending from the first groove section 331 in a direction different from a direction in which the first groove section 331 extends. In the present embodiment, the direction in which the second groove section 332 extends from the first groove section 331 is the laterally inward direction. The second groove section 332 has a first wall 332A and a second wall 332B opposite the first wall 332A, where the position of the first wall 332A is closer to the outer covering 2 than the position of the second wall. The first wall 332A has a first end portion and a second end portion, where the position of the first end portion being closer to the first groove section 331 than the position of the second end position. The second groove section 332 includes a barb protrusion 333 that is an example of a protrusion protruding from the first end portion of the first wall 332A of the second groove section 332 toward the hook tab 25B.

The engageable member 25 is disposed such that the body portion 25A is disposed in the first groove section 331, and the hook tab 25B is disposed in the second groove section 332. In this arrangement, even if the center cover 21 is pulled and a force tending to cause the engageable member 25 to be pulled out of the groove 330 (e.g., upward in FIG. 8) is generated, the hook tab 25B is caught on the edge of the second groove section 332 so that the engageable member 25 can be kept from coming off from the groove 330.

Moreover, as the barb protrusion 333 protrudes toward the hook tab 25B, the hook tab 25B is likely to catch on the barb protrusion 333, and the engageable member 25 can be more effectively kept from coming off from the groove 330.

The hook tab 25B extends laterally inward from the body portion 25A. With this configuration, when an occupant is seated on the car seat S, the center cover 21 is pulled laterally inward but the hook tab 25B moves in such a direction that the hook tab 25B catches on the second groove section 332; resultantly, the engageable member 25 can be still more effectively kept from coming off from the groove 330.

Figure 10A:
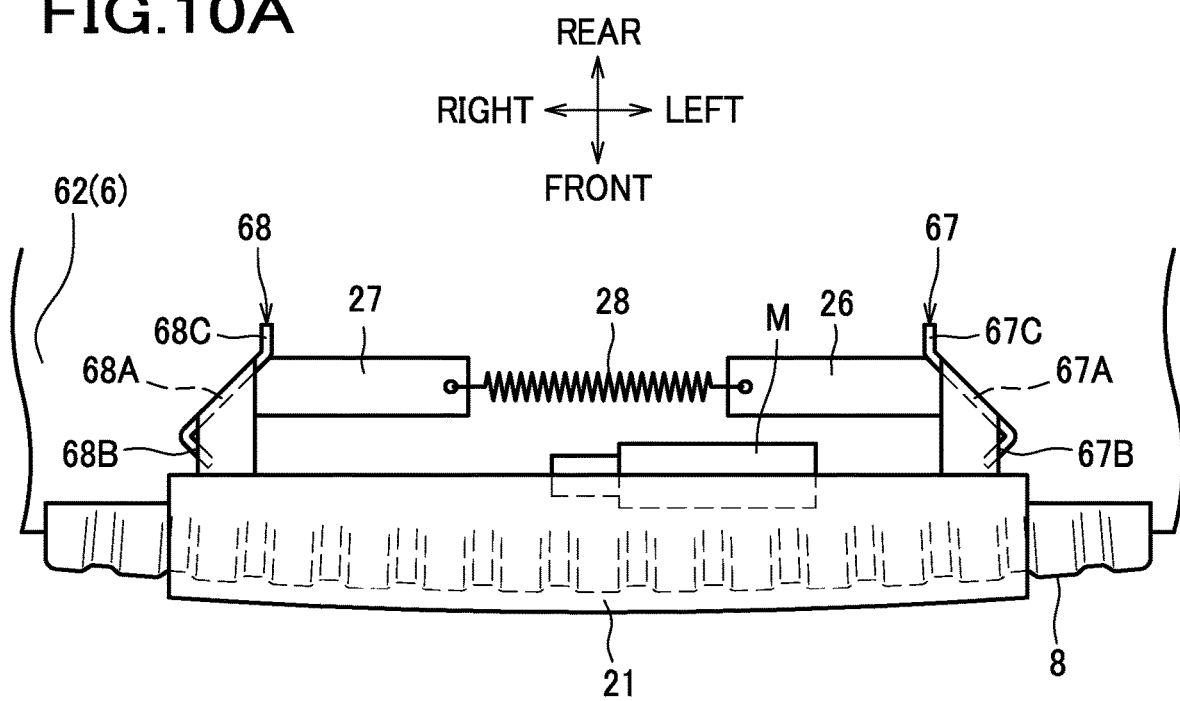
FIG. 10A is a bottom view showing a front end portion of a seat cushion in which the movable frame is in a first position.

As shown in FIG. 10A, the first strap 26 and the second strap 27 are members configured to pull the front end of the center cover 21 arranged under the movable frame 4. In the present embodiment, the first strap 26 and the second strap 27 are each configured as a wide belt-shaped member so that the center cover 21 can be pulled firmly.

The first strap 26 is fixed to the left end portion of the front end of the center cover 21. The second strap 27 is in a position spaced out laterally from the position of the first strap 26, and is fixed to the right end portion of the front end of the center cover 21.

The first strap 26 extends from the front end of the center cover 21 rearward, and is hitched around the first engageable portion 67 provided under the connecting frame 6 whereby a direction of extension of the first strap 26 is changed to the laterally inward direction.

The first engageable portion 67 includes a wire (a metal rod having a circular cross section), which is provided on an underside of the pan frame portion 62 so that the first engageable portion 67 can be fixed to the connecting frame 6 with ease. The first engageable portion 67 includes an engageable body 67A, a front end portion 67B, and a rear end portion 67C. The engageable body 67A extends substantially in parallel to the pan frame portion 62 under the pan frame portion 62. The front end portion 67B extends from the front end of the engageable body 67A toward the pan frame portion 62. The rear end portion 67C extends from the rear end of the engageable body 67A toward the pan frame portion 62.

Figure 10B:
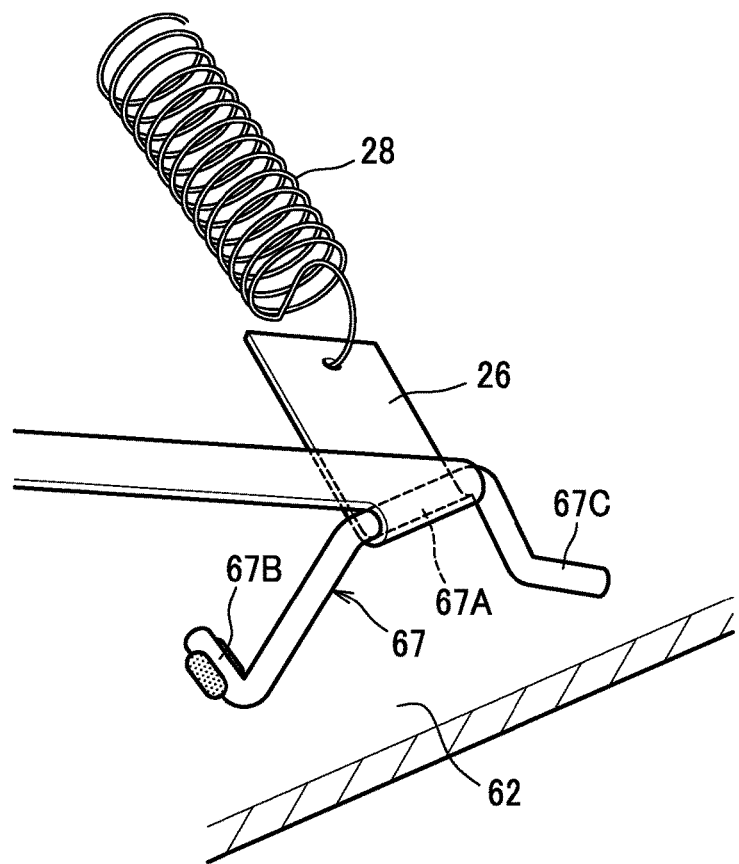
FIG. 10B is a perspective view showing a first strap, a first engageable portion and a spring provided in the front end portion of the seat cushion.

The engageable body 67A extends obliquely at an angle of 45 degrees with respect to the front-rear direction such that the engageable body 67A is disposed farther inwardly, i.e., rightward, with increasing distance from the front end toward rearward. As shown in FIG. 10B, the front end portion 67B is welded or otherwise fixed to the pan frame portion 62. The rear end portion 67C is spaced apart from the pan frame portion 62. With this configuration, the first strap 26 can be hitched around the first engageable portion 67 easily through a space between the rear end portion 67C and the pan frame portion 62.

The first strap 26 is bent to hold the engageable body 67A of the first engageable portion 67 from above and from below. To be more specific, the first strap 26 extends under the first engageable body 67A of the first engageable portion 67 from the front to the rear, then turning around the rear side of the engageable body 67A, and further extends above the engageable body 67A from the left to the right.

With this simple configuration, the direction of extension of the first strap 26 can be changed from the front-rear direction to the laterally inward direction by 90 degrees merely by hitching the first strap 26 around the first engageable portion 67, and the first strap 26 can be held firmly by the first engageable portion 67.

As shown in FIG. 10A, the second strap 27 extends from the front end of the center cover 21 rearward, and is hitched around the second engageable portion 68 provided under the connecting frame 6 whereby a direction of extension of the second strap 27 is changed to the laterally inward direction.

The second engageable portion 68 includes a wire (a metal rod having a circular cross section), which is provided on the underside of the pan frame portion 62 so that the second engageable portion 68 can be fixed to the connecting frame 6 with ease. The second engageable portion 68 has a shape symmetric to the first engageable portion 67. This second engageable portion 68 includes an engageable body 68A, a front end portion 68B, and a rear end portion 68C. The engageable body 68A extends substantially in parallel to the pan frame portion 62 under the pan frame portion 62. The front end portion 68B extends from the front end of the engageable body 68A toward the pan frame portion 62. The rear end portion 68C extends from the rear end of the engageable body 68A toward the pan frame portion 62.

The engageable body 68A extends, under the pan frame portion 62, obliquely at an angle of 45 degrees with respect to the front-rear direction such that the engageable body 68A is disposed farther inwardly, i.e., leftward, with increasing distance from the front end toward rearward. The front end portion 68B is welded or otherwise fixed to the pan frame portion 62. The rear end portion 68C is spaced apart from the pan frame portion 62. With this configuration, the second strap 27 can be hitched around the second engageable portion 68 easily through a space between the rear end portion 68C and the pan frame portion 62.

The second strap 27 is bent to hold the engageable body 68A of the second engageable portion 68 from above and from below. To be more specific, the second strap 27 extends under the second engageable body 68A of the second engageable portion 68 from the front to the rear, then turning around the rear side of the engageable body 68A, and further extends above the engageable body 68A from the right to the left.

With this simple configuration, the direction of extension of the second strap 27 can be changed from the front-rear direction to the laterally inward direction by 90 degrees merely by hitching the second strap 27 around the second engageable portion 68, and the second strap 27 can be held firmly by the second engageable portion 68.

The first engageable portion 67 and the second engageable portion 68 are arranged in the same position in the front-rear direction, i.e., to intersect one and same plane perpendicular to the front-rear direction. With this feature, portions of the first strap 26 and the second strap 27 extending in the front-rear direction have the same lengths, and the portions of the first strap 26 and the second strap 27 extending in the lateral direction are in the same position in the front-rear direction. Therefore, the center cover 21 can be pulled easily with evenly balanced forces by the first strap 26 and the second strap 27.

The spring 28 is a tension spring made of metal, which expands and contracts in the lateral direction. The spring 28 has a left end fixed to the distal end of the first strap 26 and a right end fixed to the distal end of the second strap 27 to connect the distal end of the first strap 26 and the distal end of the second strap 27. With this configuration, the first strap 26 and the second strap 27 are being pulled laterally inward. Use of the spring 28 to pull the first strap 26 and the second strap 27 serves to suppress reduction of the pulling force effectively in comparison with an alternative configuration in which a member made of rubber is used to pull the first strap 26 and the second strap 27.

With this configuration in which one and the same spring 28 is used to pull the first strap 26 and the second strap 27, space saving and reduction in number of parts can be achieved in comparison with an alternative configuration in which dedicated members (such as springs) are used to pull the first strap 26 and the second strap 27.

With this configuration in which discrete straps (first strap 26 and second strap 27) are provided and connected via the spring 28, installation of the straps to a car seat S can be performed with increased ease in comparison with an alternative configuration in which the first strap and the second strap are directly connected, for example, a single longer strap is provided.

In this embodiment, the first strap 26 and the second strap 27 are disposed near the front end of the space under the stationary frame 3, while keeping a distance sufficient to pull the center cover 21. Under the stationary frame 3, to be more specific, under the pan frame portion 62, a drive source M is provided to drive the movable frame 4. The drive source M is fixed to the front end portion of the underside of the pan frame portion 62. To be more specific, the drive source M is provided in a position shifted frontward from the positions of the first engageable portion 67 and the second engageable portion 68 in the front-rear direction and between the first engageable portion 67 and the second engageable portion 68 in the lateral direction. Accordingly, the first strap 26 is arranged to extend from the front end of the center cover 21 rearward at a first side (left side) of the drive source M and further extend laterally inwardly at the rear side of the drive source M. The second strap 27 is arranged to extend from the front end of the center cover 21 rearward at a second side (the side opposite to the first side of the drive source M at which the first strap 26 extend; right side) of the drive source M and further extend laterally inwardly at the rear side of the drive source M. With this arrangement, interference of the first strap 26 and the second strap 27 with the drive source M can be prevented.

A description will now be given of an operation of the car seat S configured as described above.

When the movable frame 4 is in the first position, as shown in FIG. 12A, the first strap 26 and the second strap 27 are pulling the front end portion of the center cover 21 of the outer covering 2 rearward, and the front end portion of the center portion 11 of the cushion pad 1 and the front end portion of the center cover 21 are thus pressed against the bent portion 82 of the body frame 8.

When the movable frame 4 moves from the first position to the second position, as shown in FIG. 12B, the movable frame 4 pushes out the center portion 11 of the cushion pad 1 frontward. Accordingly, the center cover 21 is pulled frontward, and the front end thereof moves frontward. In this way, the movement of the movable frame 4 to the second position makes the seating surface longer frontward than when the movable frame 4 is in the first position.

When the movable frame 4 moves to the second position, the engageable members 25 provided at the left and right end portions of the center cover 21 move along the grooves 330 of the side covers 300.

In the present embodiment, the carrier cover 200 is provided on the body frame 8, and the movable frame 4 thereby has an upwardly-bulging shape. Thus, the shape of the front end upper portion of the movable frame 4 (i.e., the shape of the portion of the movable frame 4 which pushes the cushion pad 1) is made gentle in comparison with an alternative configuration in which no bulge is provided on the flat upper surface of the movable frame 4. Therefore, the frontward movement of the movable frame 4 relative to the cushion pad 1 can be made smooth.

Since the plastic plate 9 is placed on the pan frame 3B (of the stationary frame 3) and the carrier cover 200 (of the movable frame 4), the shape of the members provided under the cushion pad 1 is made smooth, so that when the carrier cover 200 moves frontward under the thighs of an occupant, the occupant would be less likely to feel discomfort which would be caused by such movement. Moreover, since the plastic plate 9 is fixed to the pan frame 3B (not movable, stationary frame) and does not move when the movable frame 4 moves, the occupant would be less likely to feel discomfort which would be caused by such movement.

Figure 11:
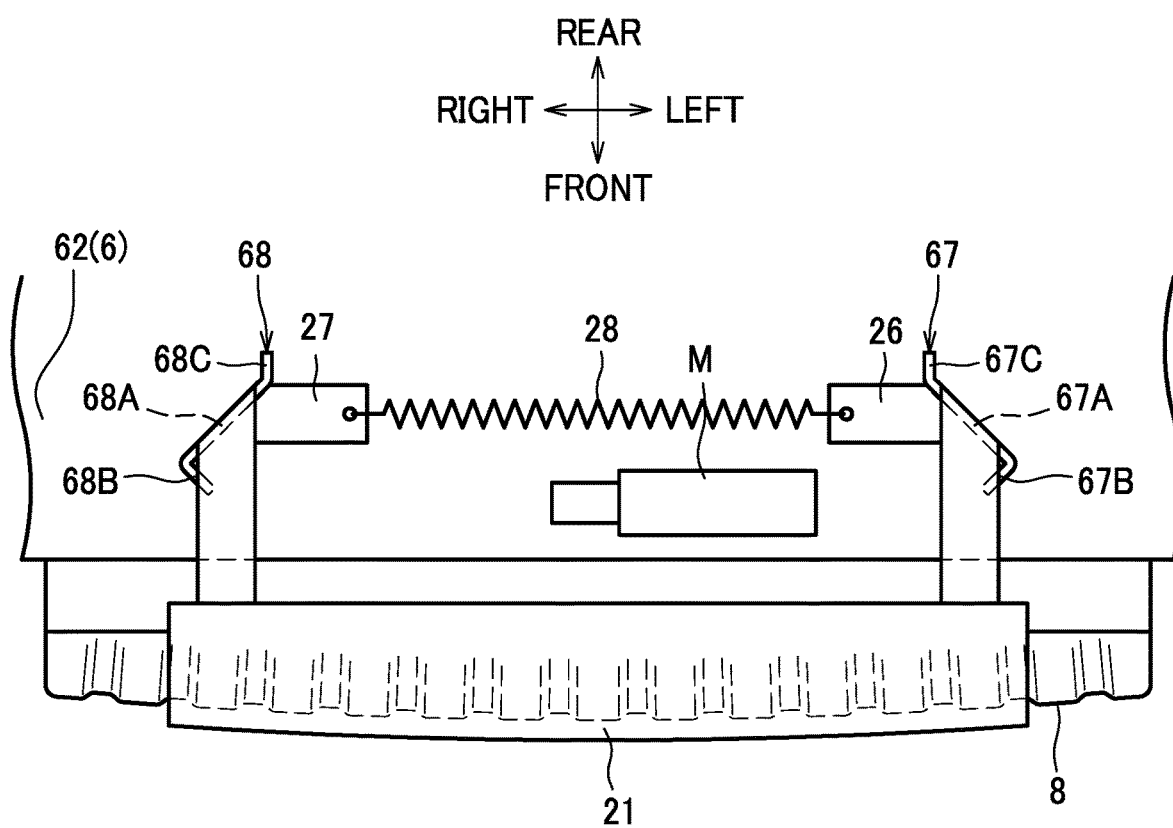
FIG. 11 is a bottom view showing the front end portion of the seat cushion in which the movable frame is in a second position.

As shown in FIG. 11, when the first strap 26 and the second strap 27 are pulled frontward by the frontward movement of the front end of the center cover 21, the spring 28 is extended and becomes longer than it is when the movable frame is in the first position.

As shown in FIG. 12A, when the movable frame 4 is moved to the first position again, the first strap 26 and the second strap 27 pull the front end portion of the center cover 21 rearward by elasticity of the spring 28. Accordingly, the center portion 11 of the cushion pad 1 and the center cover 21 are pulled rearward as if they stick to the movable frame 4.

At this time, the engageable members 25 provided at the left and right end portions of the center cover 21 move along the grooves 330 of the side covers 300.

In the present embodiment, as the rear end portion of the plastic plate 9 is fixed to the pan frame 3B that constitutes the stationary frame 3, the plastic plate 9 does not move when the movable frame 4 moves relative to the cushion pad 1. Therefore, when the movable frame 4 moves to the first position, undesirable rubbing or hitching of the rear end edge of the plastic plate 9 against the cushion pad 1 can be prevented.

Although an illustrative embodiment has been described above, specific configurations may be changed or modified, where appropriate, without departing from the spirits of the present invention.

In the above-described embodiment, the grooves 330 provided in the movable frame 4 are provided in the side covers 300 fixed to the body frame 8, but feasible configurations of the movable frame are not limited to this specific arrangement. For example, the body frame 8 may have left and right grooves in which left and right engageable members 25 provided on the outer covering 2 are engageable, respectively.

In the above-described embodiment, the engageable members 25 are illustrated as each having a shape like a letter L in cross section, but feasible forms of the engageable members are not limited to this specific example. In an alternative, the engageable member may be shaped like a letter J in cross section. To be more specific, each engageable member may include a body portion extending from the outer covering 2 and a claw portion extending from the body portion laterally inward and curved toward the outer covering 2. Each groove in which the corresponding engageable member is engageable, in this alternative example, may include a first groove section extending deep in a direction away from the outer covering 2, and a second groove extending laterally inward and toward the outer covering 2.

Any of the elements of the embodiments and alternative configurations described above may be selectively combined as desired for particular applications.

What is claimed is:

1. A vehicle seat comprising:
    a stationary frame;
    a movable frame provided at a front end portion of the stationary frame and configured to be slidable frontward and rearward between a first position and a second position that is frontward of the first position, the movable frame including left and right end portions;
    an outer covering provided to extend frontward from an upper side of the stationary frame and configured to wrap around a front end portion of the movable frame, the outer covering including left and right end portions; and
    left and right engageable members provided on the outer covering, the left and right engageable members extending, respectively, along the left and right end portions of the outer covering,
    wherein the movable frame has an upper surface, a front surface, an undersurface, and left and right grooves, the left and right grooves being provided, respectively, in the left and right end portions of the movable frame, each groove extending from the upper surface of the movable frame, through the front surface of the movable frame and further extending to the undersurface of the movable frame, the left and right engageable members being engageable in the left and right grooves, respectively,
    wherein each groove includes a first groove section extending deep in a direction away from the outer covering, and a second groove section extending from the first groove section in a direction different from a direction in which the first groove section extends, and
    wherein each of the left and right engageable members includes a body portion extending from the outer covering and a claw portion extending from the body portion, the body portion being disposed in the first groove section, the claw portion being disposed in the second groove section.

2. The vehicle seat according to claim 1, wherein the second groove section has a first wall and a second wall, a position of the first wall being closer to the outer covering than a position of the second wall, the first wall having a first end portion and a second end portion, a position of the first end portion being closer to the first groove section than a position of the second end portion, the second groove section including a protrusion protruding from the first end portion of the first wall of the second groove section toward the claw portion.

3. The vehicle seat according to claim 1, wherein the second groove section extends laterally inward from the first groove section, and the claw portion extends laterally inward from the body portion.

4. The vehicle seat according to claim 1, wherein the body portion has slits arranged along a length of the engageable member, the slits being provided in a proximal end portion of the body portion.

* * * * *